Inventor
W. G. Wilson
By Marks Clerk
Attys.

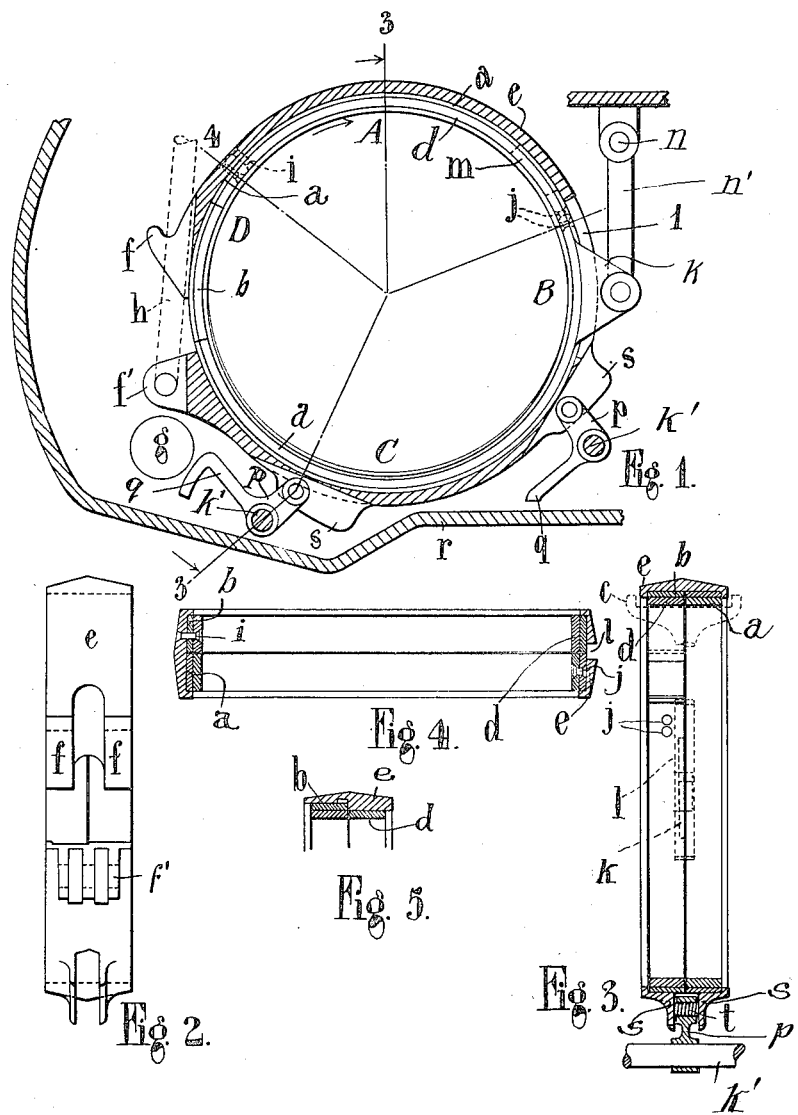

Patented May 28, 1929.

1,714,833

UNITED STATES PATENT OFFICE.

WALTER GORDON WILSON, OF SOUTH ASH MANOR, WROTHAM, ENGLAND.

BRAKE FOR CONTROLLING ROTARY MOTION.

Application filed March 31, 1924, Serial No. 703,240, and in Great Britain April 6, 1923.

This invention relates to brakes for controlling rotary motion.

A well-known defect in braking the speed of a rotary member is that although the brake is possibly otherwise efficient, an unbalanced force is produced which tends to distort or bend the axle or rotary part, drum or the like the speed of which is to be retarded.

Such defects are usually present when the braking element comprises a flexible band that is passed entirely around the rotary surface with its ends crossed and attached respectively to an anchorage and a suitable actuating device. The braking pressure produced increases per radian from a minimum to a maximum which is concentrated on a particular part of the surface, usually in the vicinity of the cross-over ends or close to the line of anchorage.

To obviate the difficulty, brakes have been suggested having a pair of jaws and known as "nut cracker" brakes. While as regards being balanced these present an improvement, they nevertheless set up exceedingly high stresses in the drums which tend to distort them.

The object of the present invention is a form of brake by which the braking pressure will be applied more nearly equally upon and all round the circumference of the rotary member whose speed is to be controlled.

Another object of the invention is a form of band brake which may be applied to control a rotary member that is carried upon a span shaft, that is in a case where it is inconvenient to have a bearing adjacent the brake member. For example, where the invention is to be applied as a reaction brake to control the various epicyclic elements in a gear box there is not always room for a bearing or bearings between the two ends of the main or other shaft; the invention is thus adapted to such a use without there being any danger of bending the shaft.

Another object of the invention is to support the brake elements where they are in the inactive position, to prevent any part thereof dropping upon and rubbing against the rotary member or members.

The invention consists in an improved braking system for controlling rotary motion comprising a flexible primary band brake element with cross-over ends, supplemented by a secondary free-ended band brake element having an anchorage independent of that of the primary element, the two together adapting themselves by relative motion to produce a more nearly equalized braking effect and leaving the centre axis of the shaft or other rotary member undistorted, the whole brake system being applied from a single actuating member.

The invention will now be described with reference to the accompanying drawings, in which:—

Figure 1 is a general side elevation of a brake constructed according to the invention in the off position;

Figure 2 is a side elevation as seen at the left of Figure 1;

Figure 3 is a vertical transverse section of Figure 1 on the line 3—3;

Figure 4 is a horizontal transverse section of Figure 1 on the line 4—4;

Figure 5 is a detail section of a modification;

Figure 6:
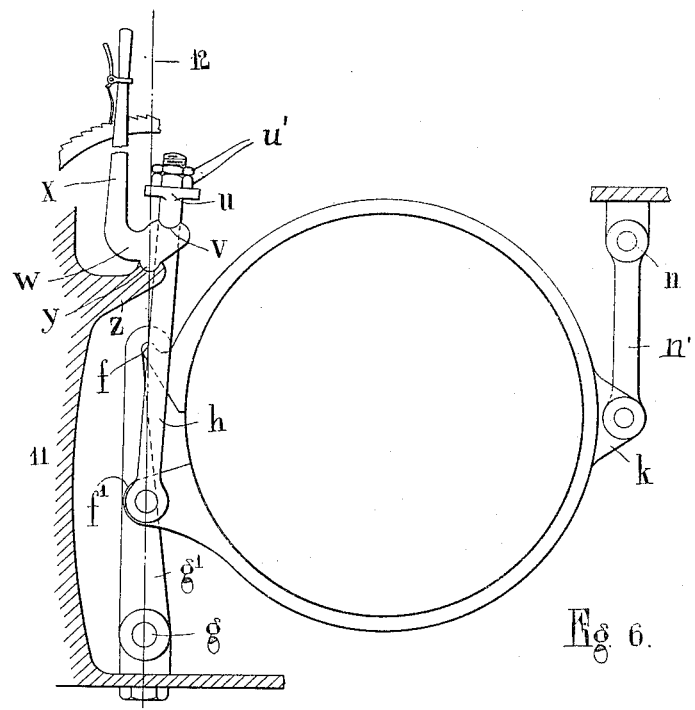
Figure 6 is an elevation similar to Fig. 1 with some of the parts omitted but showing a device for actuating the brake bands.

In carrying the invention into effect a brake according to the present invention comprises a pair of brake bands $a$, $b$, forming a secondary brake element, arranged side by side and parallel to each other around the brake drum indicated at $c$, Figure 3. Each band has its own brake lining $d$ of suitable character and superimposed upon both bands is a band brake $e$ forming a primary brake element. The hooked end $f$ of the flexible band is anchored as by means of the hooked finger $g'$, see Fig. 6 to the fixed point $g$, while the eyepiece $f'$ on the other end is connected to suitable actuating means comprising as shown in detail Fig. 6 a rod $h$ secured to the upper end of which by means of the nuts $u'$ is a yoke member $u$ adapted to ride in a socket $v$ in one end $w$ of an actuating lever $x$ fulcrumed at $y$ on a bearing $z$ that forms part of a rigid frame or casing member 11. The lever $x$ coacts with the toothed quadrant shown so that it may be locked in any adjusted position. The above actuating device constitutes a powerful toggle lever system that in the position shown corresponds to the "off" condition of the brakes, but which when moved into the position indicated by the centre line 12 will fully apply the brakes. It will be understood that any slackness of the brake due to wear can be taken up by means of the nuts $u'$.

Of the bands $a$, $b$, one end of the former, $a$, is secured as by rivets $i$ to the hooked end $f$ of the band brake $e$ and both extend together round the drum $c$, preferably following its direction of rotation. The band $a$ remains with its other end free close behind the eye-piece $f'$ and the latter, as before described, is secured to the brake-actuating means. The other band $b$ is attached, as by riveting at $j$, to an ear or lug $k$ which is extended radially through a slot $l$ in the band brake $e$ and extends round the drum $c$ following its direction of rotation and is left with a free end at about the point $m$. The lug $k$ is anchored as by link $n'$, see Fig. 6 to the fixed point $n$.

The bands $a\ b$ thus extend round the drum $c$ side by side, that is, in juxtaposed relation, with one another with their commencing ends displaced on opposite sides of the centre and nearly 180° apart. The anchorage connections are symmetrical on each side of the drum.

When such a band brake system is applied the hooked end $f$ of the primary brake band $e$ will have no movement being connected as it is by the hooked finger $g'$ to the anchorage $g$. Following its progression around the brake drum in a clockwise direction it advances relatively thereto, until at the eyed end $f'$ it has a definite total movement of say six tenths of an inch, and the band $a$ attached at $i$ thereto has substantially the same amount of movement. At the position A the movement is for example one and a half tenths of one inch, at B three tenths of an inch, at C four and a half tenths of one inch and at D six tenths of an inch. The band $b$ however is riveted at $j$ to the fixed lug $k$ and the primary brake band $e$ is pressing on the back of it, but as it is riveted to the fixed lug, relative movement occurs as the band $e$ will move over the surface of the band $b$. Therefore at the position B, the movement of the band $b$ will be nil and that of $e$ will be three tenths of an inch—relative movement in a clockwise direction.

At the position C the movement of $e$ will be four and a half tenths and $b$ will be moving one and a half tenths—the relative movement still being three tenths in a clockwise direction. At position D, the primary band $e$ will move six tenths, $b$ three tenths, a relative difference of three tenths in a clockwise direction.

Opposite the commencing end of the primary band $e$ there is a change, the latter has no movement, but the band is moving three tenths—that is—relative movement anticlockwise of three tenths. At the position A the difference between the bands is again three tenths in an anti-clockwise direction. At the position B there is the same relative movement of three tenths as described. Thus over the upper half of the drum, there is anti-clockwise movement of the brake bands always equal to three tenths, and the same amount of relative movement around the lower half but in a clockwise direction.

By the arrangement described and shown the outer flexible band $e$ will be enabled to function as a contracting member by which the bands $a$, $b$ are radially applied to the brake drum $c$, whereby the braking force will be distributed more nearly equally around the whole circumference, and there will be no bending or other distortion of the shaft, there being an anchorage at each side.

Thus the fundamental idea underlying the invention is that the flexible band $e$ is supplemented by an inner band or bands having free ends, and having an anchorage independent of that of the outer band $e$, the two together adapting themselves by relative motion to produce a more nearly equalised braking effect and leaving the shaft or other member undistorted, the whole braking system being applied from a single actuating member.

When such a braking system is relaxed, the braking bands will be free to drop and rub on the top of the drum $c$. Any suitable devices may be used to prevent this, for instance the lower part of the flexible band $e$ is adapted to be supported at two points upon a pair of double armed levers fulcrumed at $k'$ of which the shorter arms $p, p$ engage the band $e$ at the parts $s$, while the longer arms $q, q$, are arranged close to the adjacent wall of the casing $r$. It is to be noted that the shorter arms $p, p$, both extend inwards towards the centre of the rotating brake drum. When the brakes are applied both arms $p, p$ rock slightly on the fulcra $k'$ towards the left in Figure 1, and rock in the opposite direction away from the rotating drum when the brakes are relaxed. Such relaxing movement will cause the brake bands to be moved away clear of the drum, and at the same time the upper portions of the bands will be prevented from dropping upon and rubbing against the drum, by the fact that the two shorter arms $p, p$ extend towards and oppose one another and thus prevent the brake bands dropping.

As the brake actuating member is preferably of a kind in which the wear is taken up or is intermittently adjusted, the connection between the levers $p$ and the parts $s$ is preferably such as will allow relative movement to take place, and therefore the connection of the arm $p$ to the band $e$ may comprise a pair of plates *s* which form abutments for the ends of a powerful spring *t*, Fig. 3, carried and free to rotate in the one arm *p* of each bell crank lever. The plates may be of variable length corresponding with the varied contracting movements that take place on the outer flexible band and may be of a curvature struck from different centres depending upon the circumstances of each case.

In operation, when the brake is taken off the arms *q* will be moved slightly inwards, and when the brake is applied they will be moved outwards, but as the increasing wear on the bands is taken up the ends of the arms *q* will approach nearer and nearer the casing wall until when the brake is then being applied they will make contact with the casing wall so that a pressure will be produced which will have the effect of swinging the arms *p* and gradually causing them to move relatively to their plates *s*, so that the brake bands will still be kept from rubbing on the drum.

Referring to Figure 5, this illustrates a modification in which the split band *a* may be dispensed with entirely, the inner surface of the flexible band *e* constituting a direct brake and only the band *b* being retained as a separate member.

The band brake *e*, as shown in both constructions, is preferably thickened at its centre to afford strength, and it is made of suitable material previously bent to shape having its internal circumference grooved or recessed, as shown, to accommodate the bands *a*, *b* side by side.

Figure 7:
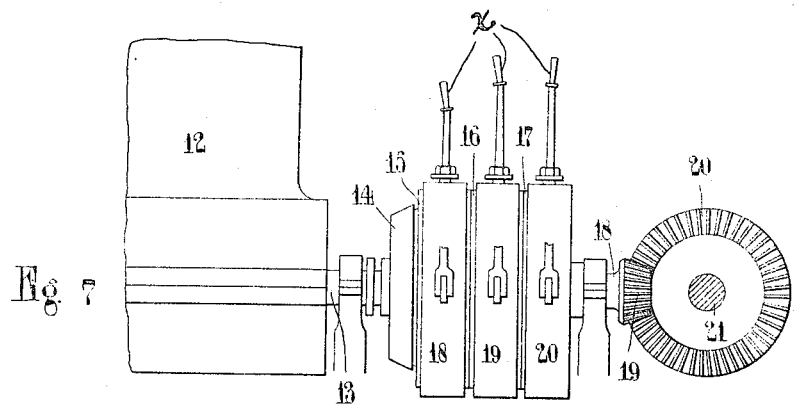
Figure 7 is an elevation showing three brakes according to the invention, in relation to controlling the speed of a self-propelled vehicle by the use of epicyclic gear elements.

Fig. 7 illustrates the application of a braking system according to the invention to the driving control of a self propelled vehicle for example a locomotive. An engine partly shown at 12 actuates a driving shaft 13 which through a cone clutch 14 drives three sets of epicyclic gears 15, 16 and 17 that are constructed in the manner shown by the applicant's prior United States Patent No. 1,404,675. Each gear element is controlled by a reaction brake 18, 19 and 20 each constructed as described above and corresponding to the primary brake element *e*. Each has its own actuating lever *x*, and the handles of such levers are off-set slightly to afford clearance for the operator's hand. When any one of the reaction brakes are tightened upon its corresponding epicyclic element, the driven shaft 18 receives a definite speed, which by means of a bevel pinion 19, is imparted to the bevel spur wheel 20 on shaft 21, which may constitute one of the axles of the locomotive.

I claim:

1. A brake comprising in combination a drum, a primary flexible brake band disposed around said drum, a pair of secondary flexible brake bands disposed in juxtaposed relation between said primary band and said drum, means for anchoring one end of one of said secondary bands, independent means for anchoring one end of the other of said secondary bands, said anchoring means being disposed substantially diametrically opposite each other, and means for contracting said primary band to draw said secondary bands into engagement with said drum.

2. A brake comprising in combination a brake drum, a substantially circular contractible member surrounding said drum, a pair of flexible brake bands disposed in juxtaposed relation between said member and said drum, means for anchoring one end of said member, means adjacent said anchoring means for securing one end of one of said brake bands to said member, means for independently anchoring one end of the other of said bands, said anchoring means being disposed substantially diametrically opposite said first mentioned anchoring means, and means for contracting said circular member to draw said secondary bands into engagement with said drum.

3. In a brake as claimed in claim 1, the combination therewith of two grip-like supports in engagement with the lower portion of the primary brake band arranged respectively on opposite sides of the vertical diameter of said drum to prevent the secondary brake bands when relaxed from rubbing upon the drum.

4. The combination in a brake as claimed in claim 1, of means whereby any slackness in the brake due to wear is taken up, and means whereby when the brake elements are relaxed such elements are prevented from rubbing upon said drum.

5. In a brake as claimed in claim 1, the combination therewith of a pair of supports in engagement with the lower part of said primary brake band, said supports being arranged on opposite sides of the vertical diameter of said drum, and means for varying the point of engagement between each of the supports and the said primary brake band.

6. In a brake as claimed in claim 1, said secondary bands each having a free end whereby when the brakes are tightened, relative movement will occur between said secondary bands in a clockwise and anti-clockwise direction respectively.

7. A brake band as claimed in claim 1 in which the primary band brake is slotted substantially midway between its two ends, a lug projecting from one of the secondary bands near one end thereof and disposed in said slot, and means for attaching the outer end of the lug to the anchorage for said last mentioned secondary brake band.

8. A band brake as claimed in claim 1, the combination therewith of a pair of lugs on the lower part of said primary band, a pair of levers each having one arm in adjustable gripping engagement with a corresponding lug, and a fixed fulcrum pin for each bell crank lever.

9. An improved braking system for controlling rotary motion, comprising in combination a brake drum, a contractible member, a pair of elongated lugs on the lower part of said contractible member, a brake casing, a pair of bell crank levers, fixed fulcrum pins on the casing to carry the bell crank levers in a position adjacent the lower part of the contractible member and on opposite sides of the vertical diameter of said drum, a yieldable connection between one arm of each bell crank lever and its corresponding elongated lug, whereby when the other arm of each bell crank lever comes into contact with the brake casing, the position of engagement between the corresponding elongated lug and the one arm of each bell crank is varied and adjusted.

10. An improved braking system for controlling rotary motion, comprising in combination a brake drum, a contractible member, a pair of parallel plates on the lower part of said contractible member on each side of the vertical diameter of said drum, a brake casing, a pair of bell crank levers, fixed fulcrum pins on the casing to pivotally carry the bell crank levers in a position adjacent the lower part of the contractible member and on opposite sides of the vertical diameter of said drum, a helical spring carried by one arm of each bell crank, and gripping between the corresponding pair of parallel plates on the contractible member, whereby when the other arm of each bell crank lever comes into contact with the brake casing the position of the gripping engagement with the contractible member is varied and adjusted.

In testimony whereof I have signed my name to this specification.

WALTER GORDON WILSON.